(12) United States Patent
Gass et al.

(10) Patent No.: US 8,428,049 B2
(45) Date of Patent: Apr. 23, 2013

(54) METHOD FOR SETTING UP AN EMERGENCY CALL IN A COMPUTER LOCAL AREA NETWORK, TERMINAL AND SERVER FOR IMPLEMENTING THE METHOD

(75) Inventors: Raymond Gass, Bolsenheim (FR); Michel Le Creff, Vigny (FR)

(73) Assignee: Alcatel Lucent, Paris (FR)

( * ) Notice: Subject to any disclaimer, the term of this patent is extended or adjusted under 35 U.S.C. 154(b) by 1137 days.

(21) Appl. No.: 11/814,768

(22) PCT Filed: Jan. 25, 2006

(86) PCT No.: PCT/FR2006/050053
§ 371 (c)(1), (2), (4) Date: Oct. 1, 2007

(87) PCT Pub. No.: WO2006/079745
PCT Pub. Date: Aug. 3, 2006

(65) Prior Publication Data
US 2009/0316683 A1    Dec. 24, 2009

(30) Foreign Application Priority Data
Jan. 26, 2005  (EP) ..................................... 05290188

(51) Int. Cl.
*H04L 12/66*    (2006.01)
(52) U.S. Cl.
USPC ....... 370/352; 370/386; 370/338; 370/395.42
(58) Field of Classification Search ............. 370/395.42, 370/230, 412, 338, 351, 352, 386, 401, 225, 370/244; 379/88.17, 309, 37, 45; 709/249; 455/445, 404.2; 348/143; 342/357.31; 340/506
See application file for complete search history.

(56) References Cited

U.S. PATENT DOCUMENTS
5,867,481 A * 2/1999 Miyagi .......................... 370/244
5,999,541 A * 12/1999 Hinchey et al. ................ 370/466
(Continued)

FOREIGN PATENT DOCUMENTS
DE    19643186 A1 *  4/1998
EP    1 435 707 A      7/2004
JP    2004 364017 A    12/2005

OTHER PUBLICATIONS
Henning Schulzrinne and Knarig Arabshian ,Providing Emergency Services in Internet Telephony,May.June. 2002, Internet Telephony.*

Primary Examiner — Asad M Nawaz
Assistant Examiner — Parth Patel
(74) Attorney, Agent, or Firm — Fay Sharpe LLP

(57) ABSTRACT

If a given terminal (IPP1) requests the setting up of an emergency call, the method consists in:
  assigning that terminal to a first virtual network (VLAN1) having a priority higher than that of any virtual network to which a terminal requesting the setting up of a non-urgent call is assigned, the given terminal then using the first virtual network to send in broadcast mode a message addressed in particular to an emergency call server (EMSR);
  assigning this terminal to a second virtual network (VLAN2) having a priority higher than that of any virtual network to which a terminal that is requesting the setting up of a non-urgent call is assigned, the emergency call server (EMSR) then using the second virtual network to respond to the given terminal in unicast mode.

14 Claims, 2 Drawing Sheets

U.S. PATENT DOCUMENTS

| | | | |
|---|---|---|---|
| 6,038,438 A * | 3/2000 | Beeson et al. | 455/404.2 |
| 6,118,866 A * | 9/2000 | Shtivelman | 379/309 |
| 6,236,365 B1 * | 5/2001 | LeBlanc et al. | 342/457 |
| 6,775,534 B2 * | 8/2004 | Lindgren et al. | 455/404.1 |
| 7,042,985 B1 * | 5/2006 | Wright | 379/45 |
| 7,050,809 B2 * | 5/2006 | Lim | 455/445 |
| 7,079,627 B2 * | 7/2006 | Crago et al. | 379/45 |
| 7,099,332 B2 * | 8/2006 | Leung | 370/395.42 |
| 7,133,499 B2 * | 11/2006 | Winegarden | 379/45 |
| 7,206,306 B2 * | 4/2007 | Beyda | 370/352 |
| 7,366,157 B1 * | 4/2008 | Valentine et al. | 370/352 |
| 7,388,868 B2 * | 6/2008 | O'Connell et al. | 370/401 |
| 7,428,002 B2 * | 9/2008 | Monroe | 348/143 |
| 7,453,990 B2 * | 11/2008 | Welenson et al. | 379/45 |
| 7,508,754 B1 * | 3/2009 | Sankaranaraynan et al. | 370/225 |
| 7,623,840 B2 * | 11/2009 | Kauppinen et al. | 455/404.1 |
| 7,630,359 B1 * | 12/2009 | Cherchali et al. | 370/352 |
| 7,714,778 B2 * | 5/2010 | Dupray | 342/357.31 |
| 7,734,019 B1 * | 6/2010 | Terpstra | 379/37 |
| 7,764,231 B1 * | 7/2010 | Karr et al. | 342/457 |
| 7,796,738 B2 * | 9/2010 | Wright | 379/45 |
| 7,894,406 B2 * | 2/2011 | Goldman et al. | 370/338 |
| 2002/0001307 A1 * | 1/2002 | Nguyen et al. | 370/386 |
| 2002/0085538 A1 | 7/2002 | Leung | |
| 2002/0143999 A1 * | 10/2002 | Yamagami | 709/249 |
| 2003/0141970 A1 * | 7/2003 | Dettinger et al. | 340/506 |
| 2003/0169751 A1 * | 9/2003 | Pulkka et al. | 370/401 |
| 2004/0081139 A1 * | 4/2004 | Beckmann et al. | 370/352 |
| 2004/0125923 A1 * | 7/2004 | See et al. | 379/88.17 |
| 2005/0053046 A1 * | 3/2005 | Wang | 370/338 |
| 2005/0091396 A1 * | 4/2005 | Nilakantan et al. | 709/232 |
| 2005/0169248 A1 * | 8/2005 | Truesdale et al. | 370/352 |
| 2005/0190892 A1 * | 9/2005 | Dawson et al. | 379/37 |
| 2005/0225442 A1 * | 10/2005 | Kanayama | 340/539.13 |
| 2006/0135116 A1 * | 6/2006 | Scholz | 455/404.2 |
| 2007/0004378 A1 * | 1/2007 | Muhonen | 455/404.2 |
| 2007/0093248 A1 * | 4/2007 | Gelderblom | 455/445 |
| 2007/0291716 A1 * | 12/2007 | Morales Barroso | 370/338 |

\* cited by examiner

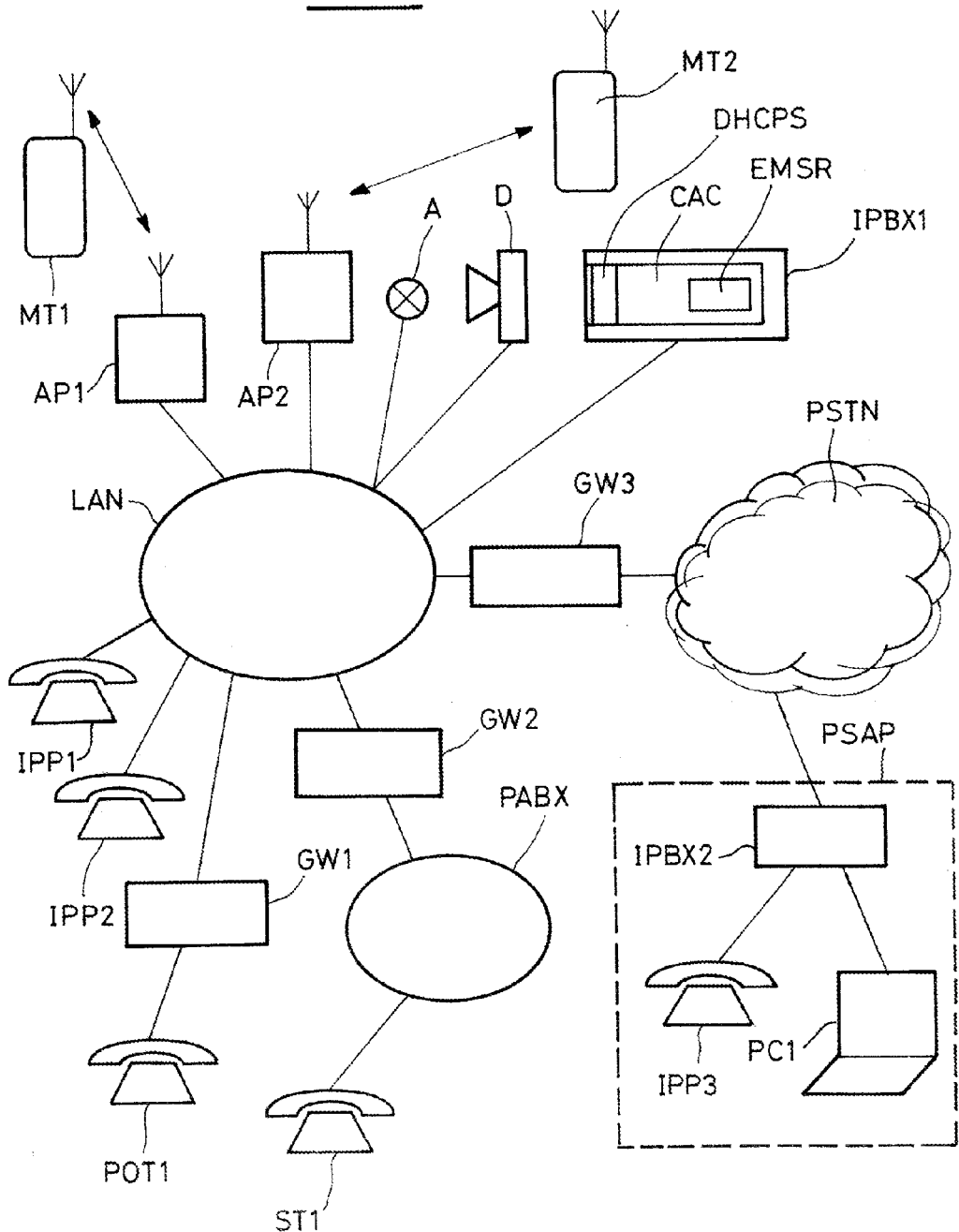
FIG_1

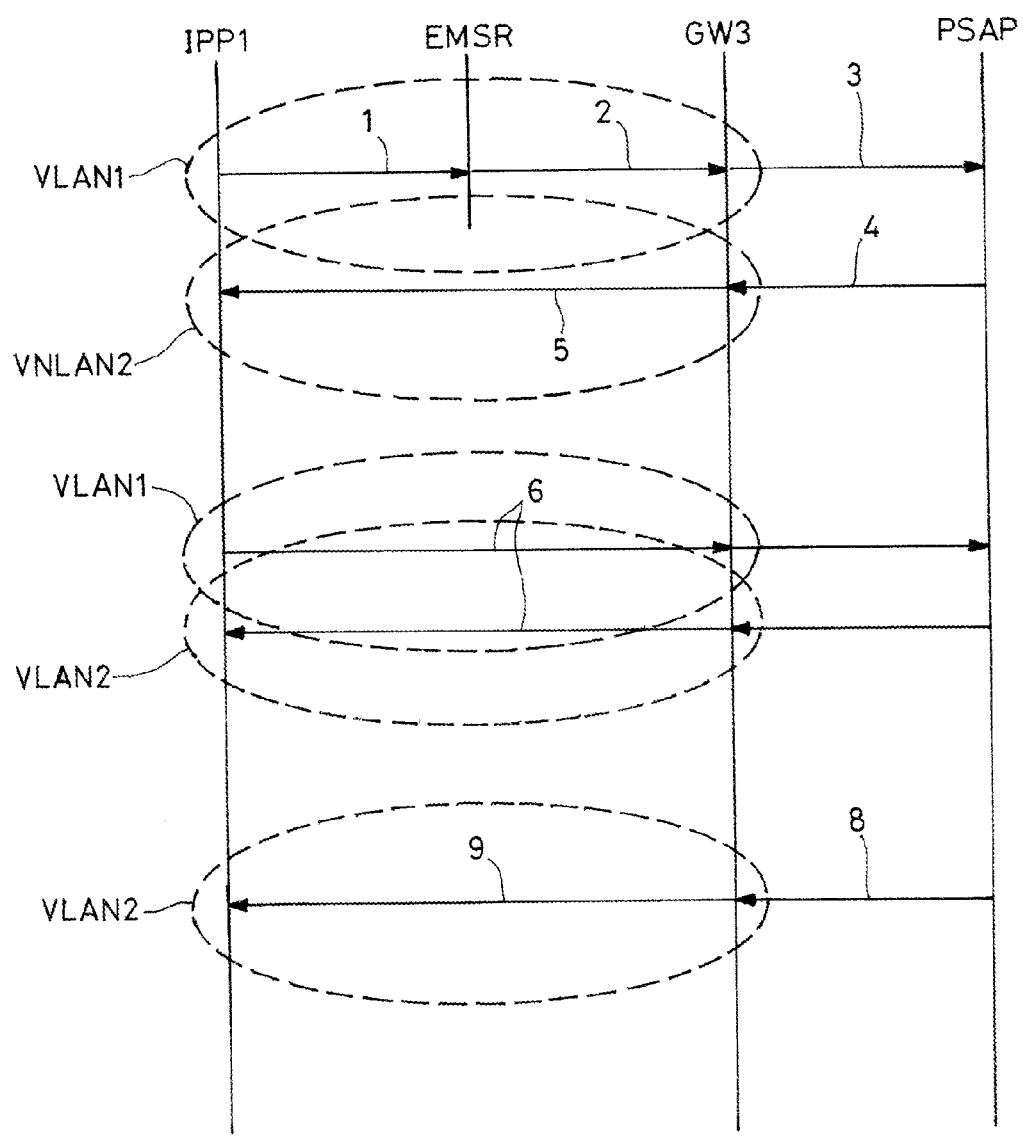

METHOD FOR SETTING UP AN EMERGENCY CALL IN A COMPUTER LOCAL AREA NETWORK, TERMINAL AND SERVER FOR IMPLEMENTING THE METHOD

The invention relates to the routing of an emergency call in a computer local area network. It is increasingly routine for businesses to use a computer local area network to route telephone calls in the form of packets of data, using the Internet Protocol as the network protocol.

A computer local area network can be subdivided into a plurality of virtual networks defining groups of terminals that can exchange data between them, whatever the physical architecture of the network. It is also possible to restrict or to prohibit the exchange of data between terminals belonging to different groups, for security reasons. By virtual network is meant a subnetwork that is defined only by logical means.

The IEEE 802.1Q standard describes how to define virtual networks in an Ethernet network. According to one of the methods described in that standard, a terminal sending a packet of data in a virtual network associates a label with that packet, that label consisting of an identifier of the virtual network. However, a frame can equally belong to a virtual network without the frame having any such label. When the packet reaches a port of a node of the local area network, that node examines if it contains a label consisting of an identifier of that virtual network:

If it contains no label, the packet is considered as coming from a predetermined virtual network that corresponds to the port of arrival.

If it contains a label, the packet is considered as coming from the virtual network the identity whereof constitutes that label.

The node further extracts from the packet a physical destination address. The node then routes the packet to an output node corresponding to that physical address, if that is permitted given the virtual network to which the packet belongs. To verify this, the node looks up in a table if this physical address is part of a predetermined list of addresses of terminals accessible via that output port and belonging to that network. If this is not the case, the packet is not transmitted farther.

For the voice packet routing delay not to degrade the quality of telephone calls, it is necessary to create at least one virtual local area network for using Internet Protocol telephones in a local area network also used to transmit ordinary data, for example between computers. This kind of virtual network is called a voice virtual network, and assigns priority to processing voice packets exchanged by the telephone terminals: these telephone terminals also access servers specific to the telephone services, and the voice packets are transmitted with the highest priority in the switches, bridges and routers, because voice packets cannot withstand transmission delays that are too long.

These virtual networks dedicated to telephony have two drawbacks:

In the case of a major accident, many users set up telephone calls simultaneously, not all of which are calls to an emergency call center. Calls that are not to the emergency call center can saturate the local area network, to the detriment of calls to the emergency call center.

Emergency call requests effected by other means, utilizing the transmission of data over the local area network, have no priority over the transmission of ordinary data: a deaf mute person will use the chat service or a multimedia service adapted to his handicap (for example an instant messaging service) to call an emergency call center. His emergency call should also take priority over transfer of ordinary data and non-urgent telephone calls.

New regulations in the USA and soon in Europe will impose even more specific processing of emergency calls transmitted in a business telecommunication network:

An emergency call must be routed automatically to an emergency call center that is a function of the location and the professional activity of the calling user.

An emergency call must be transmitted with a priority higher than that of other telephone calls.

The connection must be maintained even if the user hangs up, and until the emergency call center clears down the connection.

The number and the precise location of the calling terminal must be transmitted to the emergency call center.

A notification must also be transmitted to various alarm devices specific to the business, for example a siren, flashing lamps, a particular telephone, etc.

Current computer local area networks that support telephone calls are not adapted to meet all of the requirements of these regulations. In particular, they are not adapted so that an emergency call is set up with a priority higher than that of other telephone calls.

A first object of the invention is to propose a computer local area network adapted to set up an emergency call that satisfies in particular this requirement of the new regulations. This emergency call is generally a telephone call, but it can also be an exchange of data using any chat, instant messaging or signaling protocol (for example indicating that someone has pressed a dedicated alarm button).

A first aspect of the invention is a method for setting up an emergency call in a computer local area network, characterized in that, if a terminal requests the setting up of an emergency call, it consists in:

assigning that terminal to a first virtual network having a priority higher than that of any virtual network to which a terminal requesting the setting up of a non-urgent call is assigned, and routing at least one message from that terminal to an emergency call center via this first virtual network;

assigning this terminal to a second virtual network having a priority higher than that of any virtual network to which a terminal that is requesting the setting up of a non-urgent call is assigned, and routing at least one message from the emergency call center to that terminal via the second virtual network.

The method thus characterized enables a terminal to send a call set-up request to an emergency call center without it being possible for that request to be blocked by any other non-urgent call set-up request or any other non-urgent call already set up, because that terminal is then assigned to a first virtual network having a priority higher than that of any other virtual network to which a terminal requesting the setting up of a non-urgent call is assigned.

The emergency call center sends a response to a terminal without it being possible for that response to be blocked by any other non-urgent call, because that terminal is then assigned to a second virtual network having a priority higher than that of any other virtual network to which a terminal that requests the setting up of a non-urgent call is assigned.

In the example of an Ethernet type local area network, a standard mechanism for definition of virtual local area networks and priority is used in switches that constitute nodes of the local area network. These switches are configured once and for all so that they assign the maximum priority to these two virtual networks.

A second object of the invention is to enable a terminal to notify an emergency call to various alarm devices by simple means.

The method of the invention uses broadcast mode to route at least one message from the terminal to an emergency call center via the first virtual network and uses unicast mode to route a message from the emergency call center to the terminal via the second virtual network.

Separating the first and second virtual networks enables use of broadcast mode for transmission between a terminal and all other network units, in particular alarm devices, without risk of interfering with other terminals. Broadcast mode has the advantage of routing a message simultaneously to a plurality of destination units without the sender terminal having to know their respective addresses. The signaling message contains a particular broadcast address enabling any unit that belongs to the first virtual network to be reached. The emergency call server and the alarm devices are the only units that belong to the first virtual network, apart from the terminal that is requesting the setting up of an emergency call. Other telephone terminals therefore do not receive the signaling messages or the voice packets sent by this terminal, since those other telephone terminals do not belong to the first virtual network. The network prevents them from receiving the signaling messages and the voice packets carrying the identity of the first virtual network, since the physical addresses of these terminals are not associated with that virtual network identity in the routing tables of the nodes of the network.

Unicast mode routes a message from an emergency call center to a single terminal, the one that requested the setting up of an emergency call, without other terminals, themselves in communication with an emergency call center, and thus belonging to the second virtual network, receiving messages and packets not intended for them, thanks to the fact that the voice packets coming from the call center are routed in unicast mode in the second virtual network. The broadcast mode differs from the unicast mode in using a particular physical address value.

The invention also consists in a terminal, an emergency call server and a gateway adapted to implement the method of the invention.

The invention will be better understood and other features will become apparent in the light of the following description and the accompanying figures:

FIG. 1 represents one embodiment of the computer local area network of the invention.

FIG. 2 illustrates the operation of this embodiment, showing exchanges of signaling messages and voice packets.

As represented in FIG. 1, this embodiment primarily includes a computer local area network LAN that is preferably of Ethernet type at the link level and of TCP/IP type at the transport/network levels. A telephone switch IPBX is connected to this local area network LAN to switch telephone connections. Various types of telephone terminal are connected directly or indirectly to this local area network LAN:

Fixed telephone terminals IPP1, IPP2, of Voice Over Internet Protocol (VOIP) type, which send voice signals in the form of Internet Protocol packets and are connected directly to the local area network LAN.

Mobile telephone terminals MT1, MT2, for example of WiFi type, are connected to the local area network LAN via standard WiFi radio access points AP1, AP2.

Fixed analog telephone terminals, such as the terminal POT1, are connected to the local area network LAN via a standard gateway GW1 for digitizing, compressing and converting analog voice signals into Internet Protocol packets and vice-versa.

Fixed digital synchronous telephone terminals, such as the terminal ST1, are connected to a digital synchronous switch PABX1 which is itself connected to the local area network LAN via a standard gateway GW2 for digitizing, compressing and converting digital synchronous voice signals into Internet Protocol packets and vice-versa.

This local area network LAN is connected to an emergency call center PSAP via a gateway GW3 and a public telephone network PSTN, which is of digital synchronous type in this example. In the other examples, the Internet may be used to connect this local area network to the emergency call center.

The emergency call center PSAP is a standard call center that includes: a Voice Over Internet Protocol type telephone switch IPBX2; Voice Over Internet Protocol type telephone terminals such as the terminal IPP3; and computers such as PC1. Alarm devices AD (siren and flashing lamps) are connected to the local area network LAN to alert the staff of the business.

The switch IPBX1 includes call admission control software means CAC for processing call set-up requests. These means CAC include a subset EMSR constituting an emergency call server. This server can also have the location function, which is independent of the method of the invention. In this example, the software means CAC and EMSR are integrated into the switch IPBX1, but they could be located in different units and in this case they would dialog with each other via the local area network LAN. This local area network LAN supports a plurality of virtual networks and in particular one or more virtual networks dedicated to non-urgent telephone calls.

To use virtual networks, a bridge or a router must be able, each time that it receives a packet, to distinguish to which virtual network that packet belongs and to which virtual network the machine for which the packet is intended belongs, that destination machine being known from its physical address placed in the packet.

If a new machine is connected to the local area network LAN including a plurality of virtual networks, it is necessary to assign that machine an Internet address and a virtual network identifier. The known Dynamic Host Configuration Protocol (DHCP) initializes and dynamically configures a machine newly connected to the network. This protocol is implemented by executing DHCPS server software on one of the machines of the network, called the server, and executing DHCP client software in the other machines of the network. The server DHCPS is integrated into the switch IPBX1, for example.

When a machine is commissioned in the network LAN, its DHCP client broadcasts over the whole or part of the network a packet containing a DHCP request which informs the server DHCPS of the presence of the new machine. The server DHCPS chooses an Internet address from the addresses not yet assigned in a predetermined batch of addresses. The server DHCPS supplies that address to that machine for a predetermined time period. After that time period, the server considers the address to be free. It uses it again for another machine if the machine concerned has not in the meantime sent the server DHCPS a message to request the assignment of an Internet address again.

According to the IETF document RFC 2131, the DHCP supplies to each machine:
a transaction reference,
an Internet address,
an indication of the time period for which that Internet address is assigned, the Internet address of the next server to use to start the machine, and an optional parameters field.

Various methods are known for assigning a virtual network identifier. A first known automatic method consists in using the Logical Link Discovery Protocol (LLDP, IEEE 802.1ab). Another automatic method uses a server DHCPS and is described in the document EP1418733. It consists in:

broadcasting throughout the network, from the terminal, a message containing:
information on the terminal;
a request to the server DHCPS in particular requesting the assignment of a virtual network identifier for that terminal; and
deducing, in the server DHCPS, a virtual network identifier, in particular from information on that terminal, and sending that virtual network identifier to the terminal.

This latter method simplifies the procedure for installing a new machine since it is the server DHCPS that determines automatically a virtual network identifier and supplies it to the new machine. That identifier is deduced from the information on the terminal contained in the message broadcast by the terminal. For example, if it is an Internet Protocol telephone type terminal, a voice virtual network identifier is assigned to it.

In one particular embodiment, the message further includes a request to the parent node of the terminal that requests that node to supply indications as to the port of that node that is connected to the terminal, adding those indications to the message. In the dynamic host configuration server DHCPS, a virtual network identifier is deduced from these indications regarding the port and this information on the terminal.

In the network LAN considered by way of example, the server DHCPS integrated into the switch IPBX1 assigns a voice virtual network identifier to each telephone terminal IPP1, IPP2 for non-urgent telephone calls, that server automatically detecting if it is a telephone terminal using an indication that the terminal places in its first message on starting up.

If a user enters an emergency number on the terminal IPP1, software means executed in the terminal IPP1 recognize the emergency number and supply to the terminal two virtual network identities:

A first virtual network identity, VLAN1, that it will use to send signaling messages and voice packets to an emergency call center, this virtual network VLAN1 having a priority higher than that of the voice virtual networks for non-urgent calls.

A second virtual network identity, VLAN2, that it will use to receive signaling messages and voice packets from an emergency call center PSAP, this virtual network VLAN2 having a priority higher than that of the voice virtual networks for non-urgent calls. It will reject messages that do not contain this virtual network identity VLAN2.

FIG. 2 shows the operation of this example of a local area network LAN, showing the exchanges of signaling messages and voice packets in the situation where the terminal IPP1 requests the setting up of an emergency call:

Step 1: The terminal IPP1 detects that an emergency number has been entered by the user of the terminal. It sends a signaling message including:
the address of the Medium Access Control (MAC) level of the terminal,
the identifier of the virtual network VLAN1, which gives it the maximum priority for transfer, and
a broadcast mode MAC address, which indicates that the message is addressed to all units connected to the virtual network VLAN1 (thus the terminal IPP1 does not need to know the Ethernet address of the emergency call server EMSR or those of the alarm devices AD).

Step 2: Like all the units belonging to the virtual network VLAN1, and in particular the alarm devices AD, the emergency call server EMSR receives the signaling message. The identity of the virtual network VLAN1 that it contains indicates that this is an emergency call. The emergency call server EMSR then determines, as a function of the location of the terminal IPP1, the identity of an emergency call center PSAP that must be called. The server EMSR then sends a new signaling message to the gateway GW3 providing access to the emergency call center PSAP. That message contains:
the identity VLAN1, which ensures it has a maximum priority for transfer,
the MAC address of the terminal IPP1, and
a request for call setup between the terminal IPP1 and the emergency call center PSAP.

Step 3: The gateway GW3 sets up a session between the terminal IPP1 and the call center PSAP.

Step 4: The call center PSAP sends an acknowledgement to the gateway GW3.

Step 5: The gateway GW3 sends an acknowledgement to the terminal IPP1 via the virtual network VLAN2, contacting it using: its MAC address and the virtual network identity VLAN2. This acknowledgement has the highest priority since it is transferred via the virtual network VLAN2. This acknowledgement reaches the terminal IPP1, and only that terminal, because it is carrying its MAC address, which enables transmission in unicast mode.

Step 6: A telephone call is set up between the terminal IPP1 and the call center PSAP: the terminal IPP1 initializes the transfer of voice on a channel using the Real Time Protocol (RTP). Packets transporting voice are sent in broadcast mode by the terminal IPP1 in the virtual network VLAN1. The gateway GW3 uses the MAC address of the terminal IPP1 contained in the packets sent in broadcast mode transporting voice to assign those packets to the corresponding emergency call in the case of multiple emergency calls. Packets transporting voice, coming from the call center PSAP, are sent in unicast mode via the gateway GW3 in the virtual network VLAN2. The gateway GW3 handles transcoding of voice packets from the RTP channel to the format appropriate to the public network (for example synchronous channels at 64 kbps in the case of an integrated services digital network), and vice-versa.

Step 8: At the end of the emergency call, it is the emergency call center PSAP that terminates the call, sending a signaling message to the gateway GW3. This message causes the release of the resources used for this call in the gateway GW3.

Step 9: The gateway GW3 transmits a release message to the terminal IPP1, using its MAC address and the virtual network identity VLAN2. The effect of this message is to cancel the assignment of the terminal IPP1 to the virtual networks VLAN1 and VLAN2. It remains assigned to a virtual voice network for non-urgent calls, and can therefore send or receive ordinary calls.

In a different embodiment, the emergency call server EMSR sets up, in addition to the connection with the PSAP, a connection between the terminal IPP1 designated by the original MAC address, which contains the notification message, and another predetermined terminal of the business network, for example POT1. This terminal, called a third party terminal, is a telephone terminal situated in a gatehouse of the business, for example.

Because of the diversity of telephone terminal types that may be present in a telephone network, there is provision for the gateways GW1 and GW2 to exercise the functions that the analog terminals such as POT1 and the synchronous terminals such as ST1 cannot provide, for setting up calls in the local area network LAN. For example, the gateway GW1 includes software means for:

recognizing that a signaling message sent by the terminal POT1 is a message requesting the setting up of an emergency call, and forwarding that message in broadcast mode in the local area network LAN, adding to the message a label consisting of the virtual network identifier VLAN1;

labeling all the packets of data coming from that terminal POT1 with the identity of the first virtual network VLAN1 throughout the duration of an emergency call; and forwarding to this terminal POT1 any message carrying a MAC address corresponding to the terminal POT1 and carrying the virtual network identifier VLAN2, allowing to pass only those that do not carry the identity of the second virtual network VLAN2, throughout the duration of the emergency call.

Other types of terminals, data or multimedia terminals including no voice transmission function, can be used by handicapped users to call an emergency call center, for example a deaf mute person. These terminals include an application adapted to communicate data and, just like the voice terminal IPP1, these data terminals include means enabling them to determine if the user is calling an emergency call center or not and for assigning these terminals to the first and second virtual networks VLAN1 and VLAN2 for transporting data other than voice packets.

The invention claimed is:

1. A method for setting up an emergency call in a computer local area network, the method comprising:
    defining a first virtual network including at least one emergency call server coupled with the computer local area network, the first virtual network including no terminals participating in or requesting setup of non-emergency calls and the first virtual network having a priority higher than that of any virtual network to which a second terminal requesting the setting up of a non-emergency call is assigned;
    if a first terminal requests the setting up of an emergency call:
        assigning the first terminal to the first virtual network, and
        routing at least one message from the first terminal to an emergency call center via the first virtual network; and
    assigning the first terminal to a second virtual network having a priority higher than that of any virtual network to which the second terminal is assigned, and routing at least one message from the emergency call center to the first terminal via the second virtual network, wherein the first virtual network is different from the second virtual network;
    wherein the first terminal is operative to send packets of data carrying an identifier of the first virtual network and a broadcast mode indicator, and to receive packets of data carrying an identifier of the second virtual network and a unicast mode indicator.

2. A method according to claim 1, further comprising:
    using a broadcast mode to route at least one message from the terminal to the emergency call center via the first virtual network and using a unicast mode to route a message from the emergency call center to the terminal via the second virtual network.

3. A method according to claim 1, wherein a standard definition is used in configuring switches to assign the maximum priority to the networks.

4. The method according to claim 1, wherein the first virtual network includes at least one alarm device coupled with the computer local area network.

5. The method according to claim 1, comprising, if a user enters an emergency number on the first terminal:
    using the first terminal, detecting that an emergency number has been entered by a user of the first terminal; and
    sending a broadcast signaling message to the computer local area network, the broadcast signaling message including:
        an address of a MAC level of the first terminal,
        an identifier of the first virtual network, and
        a broadcast mode MAC address which indicates that the broadcast signaling message is addressed to all devices connected to the first virtual network.

6. The method according to claim 5, comprising:
    using the at least one emergency call server, receiving the broadcast signaling message from the first terminal;
    using the at least one emergency call server, determining that the broadcast signaling message includes the identifier of the first virtual network;
    using the at least one emergency call server, determining as a function of a location of the first terminal, an identity of an emergency call center; and
    using the at least one emergency call server, sending a new signaling message to a gateway that provides access to the emergency call center, the new signaling message comprising:
        the identifier of the first virtual network,
        the MAC address of the first terminal, and
        a request for call setup between the first terminal and the emergency call center.

7. The method according to claim 6, comprising:
    using the gateway that provides access to the emergency call center, setting up a session between the first terminal and the emergency call center; and
    using the emergency call center, sending an acknowledgment to the gateway.

8. The method according to claim 7, comprising:
    using the gateway, sending an acknowledgement to the first terminal via the second virtual network, wherein the gateway contacts the first terminal using the MAC address of the first terminal and an identifier of the second virtual network.

9. The method according to claim 8, comprising:
    setting up a call between the first terminal and the emergency call center;
    using the first terminal, initializing transfer of voice on a Real Time Protocol (RTP) channel, in which:
        the first terminal sends packets transporting voice in broadcast mode in the first virtual network,
        the gateway uses the MAC address of the first terminal contained in the packets sent in broadcast mode transporting voice to assign those packets to the corresponding emergency call, and the gateway sends packets transporting voice which come from the emergency call center in unicast mode via the second virtual network.

10. The method according to claim 9, comprising:
at the end of the emergency call, using the emergency call center, terminating the emergency call by sending a signaling message to the gateway to cause release of resources used for this call in the gateway; and
using the gateway, transmitting a release message to the first terminal, the release message including the MAC address of the first terminal and the identifier of the second virtual network to cancel the assignment of the first terminal to the first and second virtual networks.

11. An Internet type telephone terminal comprising:
a data terminal assigning the internet type telephone terminal to a first virtual network and to a second virtual network if the internet type telephone terminal requests the setting up of an emergency call, where the first and second virtual networks each have a priority higher than that of any virtual network to which is assigned a second terminal that is requesting the setting up of a non-emergency call, the first virtual network including at least one emergency call server coupled with a computer local area network and the first virtual network including no terminals participating in or requesting setup of non-emergency calls;
wherein the Internet type telephone terminal is operative to send packets of data carrying an identifier of the first virtual network and a broadcast mode indicator, and to receive packets of data carrying an identifier of the second virtual network and a unicast mode indicator.

12. The Internet type telephone terminal according to claim 11, wherein the first virtual network includes at least one alarm device coupled with the computer local area network.

13. A gateway, comprising:
a first connection for connecting to an analog telephone terminal or a digital synchronous telephone terminal;
a second connection for connecting to an Internet type local area network providing a telephony service; and
at least one processor operatively coupled with the first connection and the second connection to:
when a telephone terminal sends a message requesting setting up of an emergency call:
recognize that the message is requesting the setting up of an emergency call, and
forward the message in broadcast mode in the local area network, adding to the message a virtual network identifier corresponding to a first virtual network and a broadcast mode indicator, the first virtual network including at least one emergency call server coupled with the Internet type local area network, and the first virtual network including no terminals participating in or requesting setup of non-emergency calls and the first virtual network having a priority higher than that of any virtual network to which is assigned a terminal that is requesting the setting up of a non-emergency call;
add to any message coming from the terminal a virtual network identifier corresponding to the first virtual network during the duration of the emergency call; and
forward to the terminal any message carrying an address corresponding to the terminal and carrying a virtual network identifier corresponding to a second virtual network and a unicast mode indicator, the second virtual network having a priority higher than that of any virtual network to which is assigned a terminal that is requesting the setting up of a non-emergency call.

14. The gateway according to claim 13, wherein the first virtual network includes at least one alarm device coupled with the Internet type local area network.

* * * * *

UNITED STATES PATENT AND TRADEMARK OFFICE
CERTIFICATE OF CORRECTION

PATENT NO. : 8,428,049 B2
APPLICATION NO. : 11/814768
DATED : April 23, 2013
INVENTOR(S) : Gass et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1328 days.

Signed and Sealed this
Eighteenth Day of August, 2015

Michelle K. Lee
*Director of the United States Patent and Trademark Office*